United States Patent Office 2,900,003
Patented Aug. 18, 1959

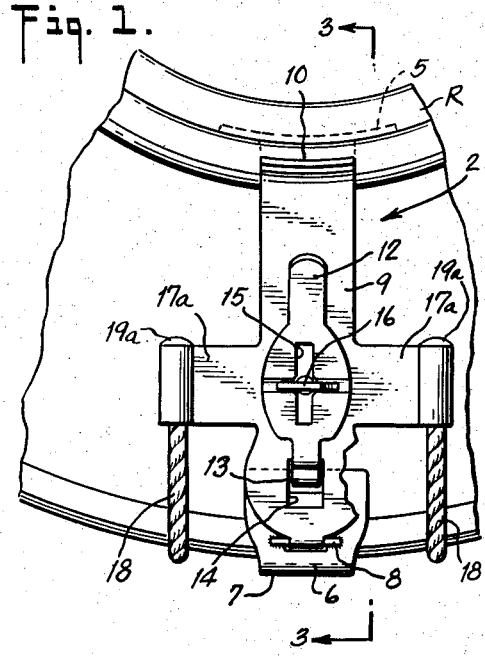
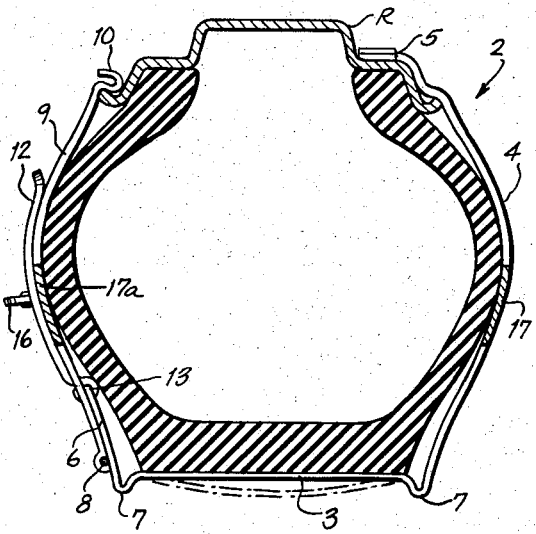
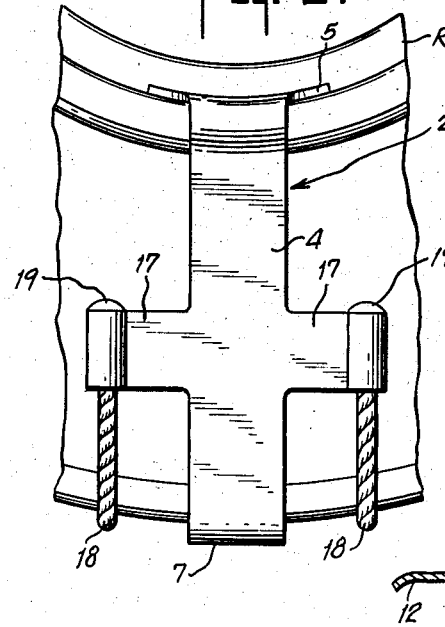
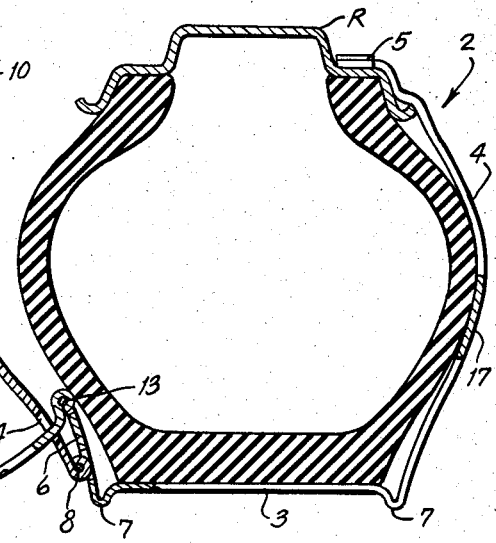

2,900,003

TRACTION DEVICE FOR VEHICLE TIRES

Delbert L. Nelson, Meadville, Pa., assignor of thirty percent to Ralph E. Meech, Meadville, Pa.

Application January 4, 1956, Serial No. 557,376

6 Claims. (Cl. 152—225)

This invention relates to a traction device for vehicle tires such as an automobile or truck, and particularly an antislipping device in the form of a shoe which is adapted to embrace the tire.

Heretofore, various types of tire traction devices and shoes have been suggested and used for vehicle tires for use when the wheel was embedded in mud or when the vehicle was being used on ice and snow. Practically all of these devices were impractical for the reason that they would not stay on the wheel or tire and would be thrown off when the wheel was spun thereby defeating the purpose for which they were intended. This was primarily due to the fact that they were secured to the rim of the wheel and tire and depended solely on this securement to the rim for maintaining the device on the wheel. In accordance with the present invention, there is provided a traction device which is so constructed and arranged that it is held on the tire primarily by the pressure thereof and the weight of the vehicle against the traction device.

Accordingly, it is the general object of the present invention to provide an improved traction device for tires having a resilient traction bar portion whereby the device is maintained on the tire under any possible condition primarily due to the action of the tire thereagainst.

It is another object of the invention to provide an improved traction device which is simple and inexpensive in its construction and at the same time efficient and effective in its use.

It is a further object of the invention to provide an improved traction device which can be easily and quickly mounted on a tire and removed therefrom with the least amount of effort.

Various other objects and advantages of this invention will be more apparent in the course of the following specification and will be particularly pointed out in the appended claims.

In the accompanying drawings, there is shown for the purpose of illustration, an embodiment which my invention may assume in practice.

In these drawings:

Fig. 1 is a side view of the improved traction device in accordance with the present invention showing it assembled on a tire, Fig. 2 is a side view of the opposite side thereof, Fig. 3 is a sectional view taken on line 3—3 of Fig. 1, and Fig. 4 is a sectional view similar to Fig. 3 showing the device in its open position and being assembled on the tire.

Referring more particularly to the drawings, the improved traction device of the present invention consists of a substantially V-shaped clamp member 2 made of relatively thin metal having a central traction resilient bar portion 3 and a relatively long side arm portion 4 terminating in an inwardly bent portion 5 which is adapted to engage and clamp onto the rim R and a shorter side arm portion 6. The side arm portions 4 and 6 are adapted to span the tire T and to engage the side walls thereof.

The central traction bar portion 3 of the clamp member is formed at either end thereof so as to provide lug-like portions 7 disposed below the central traction bar portion at either end thereof at the ends of the side arm portions 4 and 6.

There is pivotally attached to the shorter side arm portion 6, as at 8, intermediate the length thereof, an arm member 9 which is adapted to extend up along the outer side of the side wall of the tire. The upper end of this arm member is preferably bent inwardly, as at 10, so as to provide a means to engage the outer side of the rim, as shown in Fig. 3. However, this rim clamping portion 10 of the arm member 9 is not absolutely necessary and this arm like member may terminate short of the rim as it is the only purpose of this arm to initially secure the traction device to the tire. That is to say, it is not held on the tire primarily due to its engagement with the rim but by the pressure of the tire as will be explained hereinafter.

A latch member 12 is provided having its inner end pivotally attached to the upper end of the shorter side arm portion 6, as at 13. This latch member 12 extends outwardly through an aperture 14 in the arm member 9. In this latch member 12 centrally thereof, there is an aperture 15 through which a rotatable turn key member 16 mounted on the arm member 9 extends to lock the latch member in superimposed relation on the outer side of the arm member 9 so as to hold this arm member in engagement with the outer side wall of the tire.

On the longer side arm portion 4, and the arm member 9, there are arranged transversely extending arm-like portions 17 and 17a, respectively. There is provided preferably a pair of flexible cable members 18 which extend around the tread and partially around the side walls of the tire. The ends of these cable members are secured to the arm-like portions 17 and 17a as at 19 and 19a with one positioned to either side of the clamp member 2 at a spaced distance therefrom.

Having described the construction of the improved traction device of my invention, it is assembled on the tire in the following manner. It will be assumed that the clamp member is in its open position with the latch member 12 unlocked and the arm member 9 in its retracted position, as shown in Fig. 4 of the drawings. In order to assemble the device on the tire, the clamp member is positioned on the tire so that the side arm portions 4 and 6 span the tire T and pass into engagement with the side walls thereof. The inwardly bent part 5 of the longer side arm portion 4 is then positioned over the edge of the rim R, as shown in Fig. 4. In this position it will be seen that the side arm portions 4 and 6 engage the side walls of the tire and that the traction bar portion 3 is disposed across the tread of the tire. The device is now in position to be clamped to the tire.

The arm member 9 is then moved inwardly toward the tire about its pivotal connection 8, into engagement with the outer side wall of the tire with the extreme end portion 10 thereof engaging the outer side of the rim. The latch member 12 is then moved inwardly about its pivotal connection 13 into superimposed relation on the outer side of the arm member 9. In so doing the key member 16 passes through the aperture 15 in the latch member. The key member 16 is then rotated so as to lock the device in engagement with the tire, as shown in Fig. 3 of the drawings. To remove the device from the tire, the reverse procedure is followed.

It will be understood that the device is not held on the tire by means of the clamping action of the latch member 12 and the side arm portions 4 and 6 with their engagement with the rim. The device is held on the tire primarily due to the resilient action of the traction bar portion 3. When the device is assembled on the tire this traction bar portion will assume a slight arcuate shape, as shown in the broken lines of Fig. 3. Thus, it will be seen the greater the weight on this traction bar portion 3, the greater the clamping action of the side arm portions 4 and 6 together with the arm member 9 on the side walls of the tire. Accordingly, it will be seen that the resilient action of this transverse bar portion is the most important aspect of the present invention and the difference between failure and success of this type of device.

As a result of my invention, it will be seen that there is provided a traction device which can be easily and quickly assembled on and removed from the tire with the least amount of exertion and without the need of special tools. It will also be seen that the device is so constructed and arranged that it firmly grips the tire at all times thereby eliminating the danger of it being thrown off and becoming accidentally displaced when the wheel is turning. Also, the device consists of a minimum number of parts which can be easily and inexpensively fabricated and assembled and, at the same time, provide a strong and rugged construction.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. A traction device for use on a pneumatic tire and rim assembly comprising a clamp member made of relatively thin strap-like metal having a central traction bar portion and side arm portions adapted to span the tread and side walls of the tire, one of said side arm portions being longer than the other and of sufficient length to clamp onto the rim, an arm member having the lower end thereof pivotally attached to the shorter side arm portion, a latch member pivotally secured to the shorter side arm portion of said clamp member for holding said arm member in engagement with the side wall of the tire, and means for holding said latch member in locked position, the central traction portion of said clamp member being resilient and terminating at each end thereof in a portion disposed radially outwardly so as to provide lug-like portions whereby the pressure of the tire on said traction bar portion tends to urge said side arm portion together with said arm member toward the opposite side arm portion so as to maintain said clamp member securely in engagement with the side walls of the tire.

2. A traction device as defined in claim 1, including transversely extending arm-like portions carried by the longer side arm portion and the arm member, respectively, intermediate the length thereof, a pair of flexible cable members disposed around the tread and side walls of the tire having their ends attached to said arm-like portions, one of said cable members positioned at each side of said traction bar portion at a spaced distance therefrom.

3. A traction device for use on a pneumatic tire and rim assembly comprising a clamp member made of relatively thin strap-like metal having a central traction bar portion and side portions adapted to span the tread and side walls of the tire, one of said side arm portions being shorter than the other, with the longer being of sufficient length to clamp onto the rim, an arm member pivotally attached to the shorter of said side arm portions adjacent the lower end thereof, a latch member pivotally secured to the end of said shorter side arm portion and extending through an aperture in said arm member, and means for locking said latch member in superimposed relation on the outer side of said arm member, the central traction bar portion of said clamp member being resilient whereby the pressure of the tire on said traction bar portion tends to urge said side arm portions and arm member toward the opposite disposed arm portion so as to maintain said clamp member securely in engagement with the side walls of the tire.

4. A traction device as defined in claim 3, including transversely extending arm-like portions carried by the longer side arm portion and the arm member, respectively, intermediate the length thereof, a pair of flexible cable members disposed around the tread and sidewards of the tire having their ends attached to said arm-like portions, one of said cable members positioned at each side of said traction bar portion at a spaced distance therefrom.

5. A traction device for use on a pneumatic tire and rim assembly comprising a clamp member made of relatively thin strap-like metal having a central traction bar portion and side arm portions adapted to span the tread and side walls of the tire, one of said side arm portions being longer than the other and adapted to clamp onto the rim, an arm member pivotally attached to the shorter side arm portion which is adapted to engage the upper portion of the side wall of the tire, a latch member pivotally attached to the upper end of said shorter side arm portion and extending through an aperture in said arm member, and means for locking said latch member in superimposed relation on the outer side of said arm member so as to hold said arm member in engagement with said side wall, the central traction bar portion of said clamp member being resilient and terminating at each end thereof in a portion disposed radially outwardly so as to provide lug-like portions whereby the pressure of the tire on said traction bar portion tends to urge said side arm portions toward one another so as to maintain said clamp member securely in engagement with the side walls of the tire.

6. A traction device as defined in claim 5, wherein the arm member is of sufficient length to clamp onto the rim.

References Cited in the file of this patent

UNITED STATES PATENTS

| | | |
|---|---|---|
| 2,440,863 | Laggio | May 4, 1948 |
| 2,625,193 | La Rocca | Jan. 13, 1953 |
| 2,664,934 | Safran | Jan. 5, 1954 |